US 7,301,657 B2

(12) United States Patent
Gragg et al.

(10) Patent No.: US 7,301,657 B2
(45) Date of Patent: Nov. 27, 2007

(54) PRINTER INCLUDING VIDEO DECODER

(75) Inventors: Brian D. Gragg, San Diego, CA (US); Joe Frank Sharit, Escondido, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 860 days.

(21) Appl. No.: 09/877,618

(22) Filed: Jun. 9, 2001

(65) Prior Publication Data
US 2002/0186405 A1 Dec. 12, 2002

(51) Int. Cl.
*G06F 15/00* (2006.01)
*G06K 1/00* (2006.01)

(52) U.S. Cl. .......... 358/1.15; 358/1.14; 710/107; 725/133; 725/53; 348/552

(58) Field of Classification Search .......... 358/1.13, 358/1.15, 1.16, 1.6, 296, 1.14; 710/22, 107, 710/18; 386/46, 68; 396/429; 348/222.1, 348/14.1, 552; 235/375; 714/746; 370/395.2; 715/839, 718; 709/250; 725/153, 53, 133
See application file for complete search history.

(56) References Cited

U.S. PATENT DOCUMENTS

| | | | | |
|---|---|---|---|---|
| 5,493,418 A | * | 2/1996 | Takahashi et al. ........... 358/296 |
| 5,696,593 A | * | 12/1997 | Chiba et al. ................. 358/296 |
| 5,793,366 A | * | 8/1998 | Mano et al. ................. 715/839 |
| 5,926,285 A | * | 7/1999 | Takahashi ................... 358/296 |
| 5,969,750 A | * | 10/1999 | Hsieh et al. ................ 348/14.1 |
| 6,018,816 A | * | 1/2000 | Tateyama .................... 714/746 |
| 6,104,886 A | * | 8/2000 | Suzuki et al. ............... 396/429 |
| 6,115,137 A | * | 9/2000 | Ozawa et al. ................ 358/1.6 |
| 6,298,405 B1 | * | 10/2001 | Ito et al. ..................... 710/107 |
| 6,366,359 B1 | * | 4/2002 | Garland ...................... 358/1.15 |
| 6,445,461 B1 | * | 9/2002 | Ozawa et al. ................ 358/1.6 |
| 6,457,072 B1 | * | 9/2002 | Fairman ...................... 710/22 |
| 6,477,589 B1 | * | 11/2002 | Suzuki et al. ................ 710/18 |
| 6,538,758 B1 | * | 3/2003 | Ikegawa ..................... 358/1.13 |
| 6,549,951 B1 | * | 4/2003 | Hui et al. .................... 709/250 |
| 6,587,140 B2 | * | 7/2003 | No .......................... 348/207.2 |
| 6,597,860 B2 | * | 7/2003 | Song et al. .................. 386/68 |
| 6,636,324 B2 | * | 10/2003 | Yamamoto ................. 358/1.13 |
| 6,674,538 B2 | * | 1/2004 | Takahashi ................... 358/1.15 |
| 6,717,694 B1 | * | 4/2004 | Fukunaga et al. .......... 358/1.16 |
| 6,728,466 B1 | * | 4/2004 | Tanaka ....................... 386/46 |
| 6,741,278 B1 | * | 5/2004 | Toyofuku et al. .......... 348/222.1 |
| 6,775,020 B2 | * | 8/2004 | Fukunaga et al. .......... 358/1.15 |
| 6,785,013 B1 | * | 8/2004 | Ota et al. .................... 358/1.15 |
| 6,824,044 B1 | * | 11/2004 | Lapstun et al. ............. 235/375 |
| 6,870,571 B1 | * | 3/2005 | Narushima et al. ......... 348/552 |
| 6,937,355 B1 | * | 8/2005 | Miyazawa et al. .......... 358/1.14 |
| 6,961,084 B1 | * | 11/2005 | Duncan et al. ............. 348/222.1 |
| 7,002,964 B1 | * | 2/2006 | Ohnishi et al. ............. 370/395.2 |
| 7,137,136 B1 | * | 11/2006 | Aratani ....................... 725/53 |
| 2002/0174444 A1 | * | 11/2002 | Gatto et al. ................. 725/133 |
| 2002/0186404 A1 | * | 12/2002 | Gragg ......................... 358/1.15 |

\* cited by examiner

*Primary Examiner*—Douglas Q. Tran
*Assistant Examiner*—Satwant Singh

(57) ABSTRACT

A printer includes an interface for receiving compressed digital video; and a circuit for performing video-decoding of the compressed video received by the interface. Such a printer can print selected video frames, without the assistance of a personal computer.

7 Claims, 1 Drawing Sheet

PRINTER INCLUDING VIDEO DECODER

BACKGROUND

Personal computers often have an integral role in capturing and printing digital images. As a first example, digital video (DV) from a DV camcorder is sent directly to an IEEE 1394 (Firewire) interface of a personal computer. Video editing software on the personal computer is used to view and edit frames of the video. The video editing software also allows selected frames to be extracted. The extracted frames are sent to a printer driver, which also runs on the computer. The printer driver converts the selected images to a format for printing, and sends the formatted images to a printer.

As a second example, a video signal from a television is sent to a television tuner card of a personal computer. The television tuner card converts the television signal to digital video. Video editing software on the computer is used to edit the digital video and extract frames from the digital video, and a printer driver can be used to format the extracted frames for printing.

As a third example, a digital camera is equipped with memory for storing captured digital images. After the memory has been filled, the digital images are transferred to a personal computer. Photo editing software is used to touch up, proof and select the digital images, and a printer driver is used to format the selected images and send the formatted images to a printer.

In each of these three examples, the personal computer plays an integral role in printing out the digital images. However, it does not always play an integral role. For instance, the HP Photosmart P1100 printer includes a memory reader that can accommodate removable memory. In a digital camera having removable memory, the memory can be removed from the camera and plugged into the memory reader. The HP Photosmart P1100 printer can then select and print out digital images stored in the removable memory. Thus the Photosmart P1100 can print out photos directly from the memory, without the assistance of a personal computer.

Eliminating the personal computer-as-middleman makes it easier to print out digital images. It also reduces cost and increases portability.

It would be desirable to print out frames of video clips without the assistance of a personal computer.

SUMMARY

According to one aspect of the present invention, a printer is capable of receiving compressed digital video, and performing video-decoding of the compressed video. Such a printer can print selected video frames, without the assistance of a personal computer.

Other advantages of the present invention will become apparent from the following detailed description, taken in conjunction with the accompanying drawings, illustrating by way of example the principles of the present invention.

DETAILED DESCRIPTION

Figure 1:
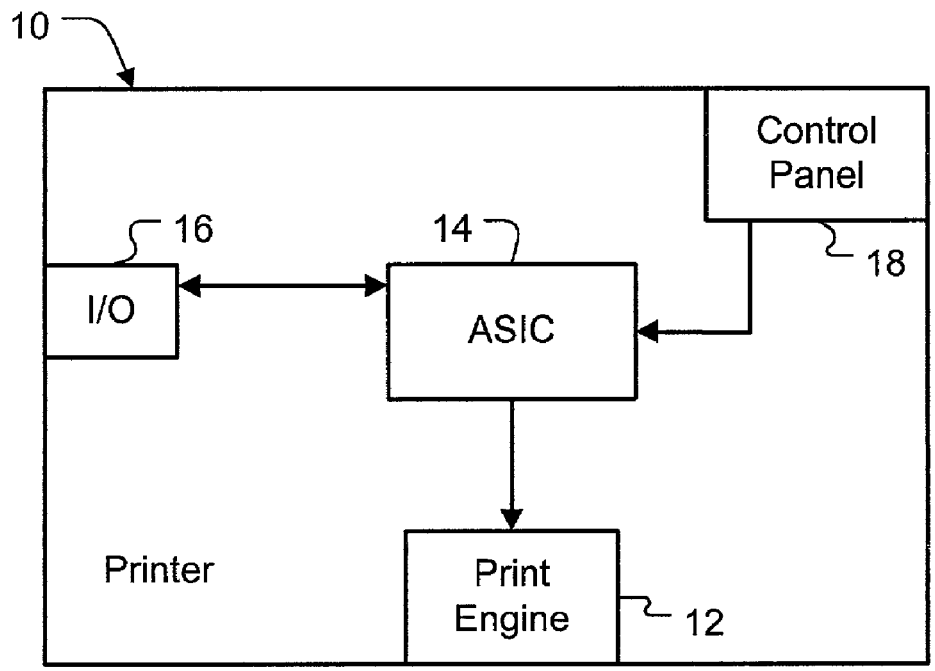
FIG. 1 is an illustration of a printer according to the present invention.

Referring to FIG. 1, a printer 10 includes print engine 12 and an application specific integrated circuit (ASIC) 14. The ASIC 14 performs conventional control of the print engine 12.

The printer 10 further includes an I/O interface 16 for receiving a stream of compressed digital video. The I/O interface 16 may be an IEEE 1394 ("Firewire") interface. Since the function of the I/O interface 16 is limited to receiving video, it need not be supported by a full array of drivers.

The stream of compressed digital video is supplied by a digital video source. Sources include, without limitation, digital televisions, digital VCRs, and digital video (DV) camcorders. The digital video source could be connected directly to the I/O interface 16, or it could be connected indirectly (e.g., via a network) to the I/O interface 16.

The ASIC 14 performs digital video-decoding of the digital video received by the I/O interface 16. The type of decoding depends upon the video source. For example, if the source provides MPEG-encoded digital video, the ASIC 14 performs MPEG-decoding. If the source provides DV-encoded digital video, the ASIC 14 performs DV-decoding. The ASIC 14 can identify the proper decoding algorithm from header information in the video stream. The decoding includes decompression of the video.

The result of the decoding is one or more reconstructed video frames. According to the DV format, frames are encoded independently. Thus the ASIC 14 buffers a frame of the video stream and decodes the buffered frame. The print engine 12 prints out the reconstructed frame. According to the MPEG format, not all frames are encoded independently. Thus the ASIC 14 buffers a Group of Pictures (GOP) and decodes one or more frames. The print engine 12 prints out one or more reconstructed frames.

The printer 10 may be provided with a control panel 18. A print button on the control panel 18 causes the ASIC 14 to reconstruct the frame that is being buffered, or it causes the ASIC to reconstruct and print a frame. In the alternative or in addition, the printer 10 may be provided with a receiver that receives a signal from a remote control. The remote control signal causes the ASIC 14 to reconstruct a frame. The remote control signal may be received by the I/O interface 16 instead of a receiver.

The ASIC 14 can reconstruct and print out a frame when the print button is pressed or the remote control signal is received. In the alternative, the ASIC 14 can continually reconstruct frames and print a reconstructed frame when the print button is pressed or the remote control signal is received.

The ASIC 14 may perform direct memory access (DMA) to access frames or GOPs from the I/O interface 16. The DMA provides the ASIC 14 with sufficient speed to capture full frames. In the alternative, an I/O interface 16 such as the IEEE 1394 interface may pause a DV stream, thereby capturing a DV frame.

Figure 2:
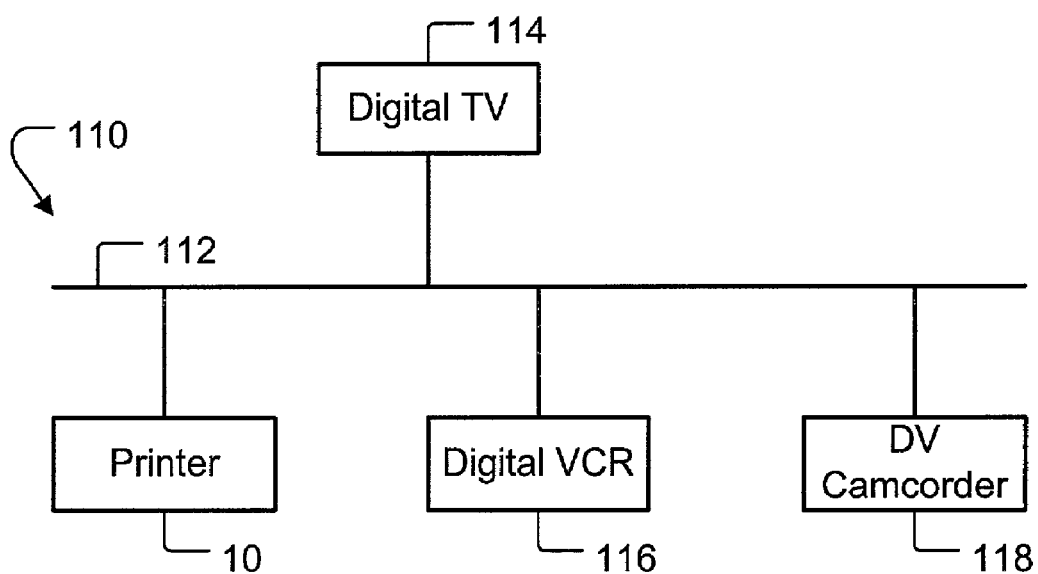
FIG. 2 is an illustration of a home audio video network.

Reference is now made to FIG. 2. The printer 10 can be connected to a home audio video network 110 situated in a home entertainment center. The I/O interface 16 of the printer 10 is connected to a backbone 112 of the network 110. Other devices connected to the backbone 112 include a digital television 114, a VCR 116, and a digital camcorder 118. A computer need not be attached. Any of these digital video sources can provide digital video to the printer 10.

A person can view the video on one of the sources 114, 116 or 118. When the person sees a video clip that he or she wishes to print, the person presses a print button on the control panel 18 or a remote control. In response, the printer 10 prints out a frame. Thus, a frame of digital video is reconstructed and printed out without the assistance of a personal computer.

The network 110 could follow the HAVi specification, a consumer electronics industry architecture. Digital audio and video devices conforming to the HAVi standard are interoperable when connected via the network 110. Such a network 110 would allow any of these devices to generate remote signals for commanding the printer 10 to print a frame.

The stream of digital video may be encoded according to a format other than DV and MPEG. For instance, the digital video may be encoded according to DTCP (a secure protocol).

The printer 10 is not limited to the IEEE 1394 interface. The digital video could be received instead by a USB 2.0 interface or other high speed interface. If video capture is desired, it could be integrated in the interface or performed by the ASIC 14.

The decoding and print engine control may be performed by a single ASIC. Within the ASIC, these functions may be performed by separate dedicated circuits, by a single embedded processor that is programmed to performed these functions, or by a combination thereof. In the alternative, these functions may be performed by separate ASICs.

The present invention is not limited to the specific embodiments described and illustrated above. Instead, the present invention is construed according to the claims that follow.

What is claimed is:

1. A printer comprising:
    an interface for receiving compressed digital video; and
    an application specific integrated circuit in the printer for performing video-decoding of the stream of compressed video received by the interface;
        wherein a digital video source is chosen from a group of a digital television, a digital video cassette recorder, and a digital video camcorder; and
        wherein printing certain frames of the stream of compressed video received by the interface is controllable by reception of a signal from a remote control device activated by a user directly viewing the digital video source in real time without an intermediary computer, the signal from the remote control device received by the application specific integrated circuit in the printer that performs video-decoding of the stream of compressed video.

2. The printer of claim 1, wherein the interface is an IEEE 1394 interface.

3. The printer of claim 1, wherein the interface can pause the video.

4. The printer of claim 1, further comprising a control panel for causing the printer to print a frame of the decoded video.

5. A printer comprising:
    a print engine;
    a digital video interface; and
    an application specific integrated circuit in the printer for performing decompression of a stream of video received at the digital video interface and for controlling the print engine to print frames of the decompressed stream of video;
        wherein a digital video source is chosen from a group of a digital television, a digital video cassette recorder, and a digital video camcorder, and
        wherein printing certain frames of the stream of compressed video received by the interface is controllable by reception of a signal from a remote control device activated by a user directly viewing the digital video source in real time without an intermediary computer, the signal from the remote control device received by the application specific integrated circuit in the printer that performs video-decoding of the stream of compressed video.

6. The printer of claim 5, further comprising a control panel for causing the circuit to decompress and print a frame.

7. An audio video network comprising:
    a digital video source of compressed video; and
    a printer for receiving and video-decoding the stream of compressed video with an application specific integrated circuit, wherein the application specific integrated circuit controls decompressing the stream of compressed video, and printing certain frames that have been reconstructed;
        wherein the digital video source is chosen from a group of a digital television, a digital video cassette recorder, and a digital video camcorder; and
        wherein printing certain frames is controllable by reception of a signal from a remote control device activated by a user directly viewing the digital video source in real time without an intermediary computer, the signal from the remote control device received by the application specific integrated circuit that performs video-decoding of the stream of compressed video.

* * * * *

UNITED STATES PATENT AND TRADEMARK OFFICE
CERTIFICATE OF CORRECTION

| | |
|---|---|
| PATENT NO. | : 7,301,657 B2 |
| APPLICATION NO. | : 09/877618 |
| DATED | : November 27, 2007 |
| INVENTOR(S) | : Brian D. Gragg et al. |

It is certified that error appears in the above-identified patent and that said Letters Patent is hereby corrected as shown below:

In column 3, line 34, in Claim 1, after "receiving" insert -- a stream of --.

In column 4, line 17, in Claim 5, delete "camcorder," and insert -- camcorder; --, therefor.

In column 4, line 30, in Claim 7, after "audio" delete "video".

In column 4, line 31, in Claim 7, after "source" insert -- including a stream --.

Signed and Sealed this

Fifth Day of August, 2008

JON W. DUDAS
*Director of the United States Patent and Trademark Office*